Patented July 3, 1934

1,965,400

UNITED STATES PATENT OFFICE 1,965,400

METHOD FOR THE PRODUCTION OF ALKALI METAL NITRATE

Colin W. Whittaker and Frank O. Lundstrom, Washington, D. C., dedicated to the free use of the Public No Drawing. Application February 27, 1932, Serial No. 595,673

5 Claims. (Cl. 23—102)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government, for governmental purposes, without payment to us of any royalty thereon.

We hereby dedicate the invention herein described to the free use of the public to take effect upon the granting of a patent to us.

This invention relates to the manufacture of alkali metal nitrates from solid minerals or salts containing alkali metals. Our process is adapted to the economical production of alkali metal nitrate and involves treating minerals or salts containing alkali metals with oxides of nitrogen. We have discovered that alkali metal nitrate is formed when oxides of nitrogen are passed so as to come into contact with certain solid alkali metal minerals and salts. Examples of such minerals or salts are kainit and muriate which are available in large quantities in various parts of the world.

We have discovered that the formation of alkali metal nitrate proceeds more favorably if the solid alkali metal mineral or salt has been humidified with water when or before being exposed to the oxides of nitrogen. This humidification may be accomplished in any suitable manner such as addition of liquid water, or exposure to a damp atmosphere when or before the oxides of nitrogen are passed in contact with the solid alkali metal mineral or salt. Thus we have found that when gaseous nitrogen peroxide is passed at ordinary temperatures through a tower packed with solid potassium chloride containing between 2 and 3 per cent moisture over 90 per cent of the potassium chloride is converted into potassium nitrate.

We are aware that in the prior U. S. Patent #1,604,660, issued to William H. Ross and Arnon L. Mehring, on October 26, 1926, there is disclosed a process for the production of alkali metal nitrate from alkali metal chloride by bringing a stream of nitrogen peroxide-air mixture in contact with a solution of the corresponding alkali metal chloride. We are also aware that in the prior U. S. Patent #1,658,519 for a process for the preparation of nitrates and a dry mixture of chlorine and nitrosyl chloride, issued to Walenty Dominik, on February 7, 1928, there is disclosed the production of nitrates by treating metallic chlorides with aqueous nitric acid.

Both these said inventions of Ross and Mehring and of Dominik have the advantage of producing by-products together with the nitrate. But the processes of both these patents have the disadvantages that they employ corrosive solutions and that crystallization processes are required to recover the nitrates. These facts increase the cost of operating according to both these said patents.

In the present invention, these disadvantages are obviated in that alkali metal nitrates can be produced by bringing oxides of nitrogen in contact with solid substances containing alkali metals. We are thus able to avoid the use of solutions required in both the above named inventions. These solutions contain nitric acid and are highly corrosive which necessitates the use of expensive acid resisting materials. But in our invention we are able to produce solid alkali metal nitrate from the solid mineral or salt containing alkali metals without the use of any solutions thereby effecting great economy of operation.

We are also aware that in the prior U. S. Patent #948,726 issued to Birger Fjeld Halvorsen on February 8, 1910 there are disclosed useful improvements in the method of absorbing dilute nitrous gases. Claims four and five of the said Halvorsen invention need not be considered since they specify lime as an absorbent for nitrous gases while our claims concern only substances containing alkali metals. The said Halvorsen invention discloses the absorption of hot, dilute, nitrous gases which comprises conducting said gases while hot into contact with dry solids capable of reacting with the said nitrous gas; but we have discovered that alkali metal nitrate is formed when oxides of nitrogen are passed so as to come into contact with certain solid alkali metal minerals and salts. We have discovered further that the solid substances containing alkali metals need not be dry, and preferably should be in a humid condition. We have discovered further that for the formation of alkali metal nitrates the oxides of nitrogen used need not be hot or dilute as specified in the said Halvorsen invention but that the formation of alkali metal nitrate takes place when the oxides of nitrogen are used at ordinary temperatures and ordinary concentrations.

In order to specifically illustrate our present invention, but without limiting the same we give the following example:

Pass nitrogen peroxide, previously purified by passage over phosphorous pentoxide as described by us on page 1411, vol. 23, of Industrial and Engineering Chemistry, so as to come into contact with humid, solid potassium chloride or muriate packed in a tower or converter. The nitrogen peroxide may be derived from ammonia oxidation or other source. The potassium chloride will be converted into potassium nitrate. The potassium nitrate is produced as a solid and is suitable for direct use on removal from the converter or tower. Purification of the product, by well known methods, may be resorted to if desired without departing from the spirit of the invention.

The general procedure consisted in passing nitrogen peroxide gas through a tower packed with potassium chloride crystals and determining the nature of the products of the reaction.

The nitrogen peroxide, prepared by the oxidation of ammonia with oxygen, was kindly supplied by J. Y. Yee of the United States Department of Agriculture. It contained some nitric oxide and probably also nitrous and nitric acids, and was purified by triple distillation. In each distillation, oxygen was bubbled through the liquid nitrogen peroxide and passed with the gaseous peroxide through a phosphorous pentoxide drying tube and then through the condenser where the nitrogen peroxide was condensed. The potassium chloride and other reagents used were C. P.

A tube containing the purified liquid nitrogen peroxide, was sealed to the tower containing potassium chloride crystals that had been dried at 120° C., and a trap for condensing the effluent gas was sealed to the outlet of the tower. Dry oxygen was then passed through the reaction tower and the trap for about 3 hours to remove any moisture that might have gotten into the apparatus when the seals were made. Twenty-five cubic centimeters of liquid nitrogen peroxide (a large excess) were allowed to evaporate through the potassium chloride tower over a period of 24 hours. The reaction tower was then flushed out with dry oxygen to remove any nitrogen-containing gases, and the nitrogen content of the salt therein was determined by the Devarda alloy method.

Although a large excess of nitrogen peroxide had been used, it was found that the salt contained only 1.7 per cent of potassium nitrate on the assumption that all the nitrogen was present as nitrate.

In a second experiment the anhydrous salt was replaced by potassium chloride that contained 2.4 per cent of moisture. About 20 cc. of liquid nitrogen peroxide was vaporized and allowed to pass through the potassium chloride in the course of 3 hours. After the tower had been flushed out with oxygen to remove the nitrogen-containing gases, the salt that remained in the tower had, after drying at 120° C., a nitrogen content corresponding to 93.23 per cent of potassium nitrate.

Our process may be carried out at room temperature, but we do not limit ourselves to such temperatures. The process may be conducted by treating successive batches of solid alkali metal mineral or salt or by a continuous method whereby the salt passes continuously through a converter which allows the moving solid alkali metal salt or mineral to come into contact with the oxides of nitrogen. The newly formed potassium or other alkali metal nitrate is removed from the converter as rapidly as may be deemed necessary.

It is specifically understood that by the term nitrogen peroxide, as used herein, is meant nitrogen dioxide ($NO_2$), nitrogen tetroxide ($N_2O_4$) and mixtures of the two. When we speak of the gases we mean oxide without water. We may employ a mixture of nitrogen oxides which contains nitrogen peroxide.

It is further specifically understood that by the term "alkali metal" as used herein, is meant the alkali metal elements, namely: sodium, lithium, potassium, caesium, rubidium and also the ammonium radical ($NH_4$).

It is further specifically understood that by the term substance as used herein, is meant minerals, salts and compounds.

It is further specifically understood that by the term "humid condition" is meant any concentration of water up to sufficient water to cause the appearance of a definite, visible, liquid phase.

Having fully described our discovery, we claim as our invention:

1. The method of producing alkali metal nitrate which comprises treating solid alkali metal chloride in a humid condition, with dry oxides of nitrogen containing nitrogen peroxide.

2. The method of producing alkali metal nitrate which comprises treating solid alkali metal chloride in a humid condition, with dry nitrogen peroxide.

3. The method as specified in claim 1, when water as a humidifier is added or used with the solid alkali metal chloride, in any amount up to but not including sufficient water to cause any appreciable change in the solid state of the alkali metal chloride.

4. The method as specified in claim 1, when solid potassium chloride is used which contains from one thousandth of one percent to twenty-five percent water by weight.

5. The method as specified in claim 1, when solid potassium chloride is used which contains about two and four tenths (2.4) per cent water by weight.

COLIN W. WHITTAKER.
FRANK O. LUNDSTROM.